United States Patent
Bell et al.

(10) Patent No.: US 10,495,025 B2
(45) Date of Patent: Dec. 3, 2019

(54) FLAMELESS COMBO HEATER

(71) Applicant: ConleyMax Inc., Calgary AB (CA)

(72) Inventors: Patrick G. Bell, Calgary (CA); William N. Beckie, Calgary (CA)

(73) Assignee: ConleyMax Inc., Calgary, Alberta (CA)

( * ) Notice: Subject to any disclaimer, the term of this patent is extended or adjusted under 35 U.S.C. 154(b) by 1206 days.

(21) Appl. No.: 13/834,942

(22) Filed: Mar. 15, 2013

(65) Prior Publication Data

US 2014/0263681 A1 Sep. 18, 2014

(51) Int. Cl.
*F02G 5/00* (2006.01)
*F24D 15/02* (2006.01)
*F24V 40/00* (2018.01)

(52) U.S. Cl.
CPC .............. *F02G 5/00* (2013.01); *F24D 15/02* (2013.01); *F24V 40/00* (2018.05)

(58) Field of Classification Search
CPC ....................................................... F24J 3/003
See application file for complete search history.

(56) References Cited

U.S. PATENT DOCUMENTS

| | | | | |
|---|---|---|---|---|
| 4,264,826 A | * | 4/1981 | Ullmann | F01K 17/005 122/26 |
| 4,385,594 A | * | 5/1983 | Hauser, Jr. | F01P 3/20 123/41.29 |
| 4,680,975 A | * | 7/1987 | Dodt | G01M 15/044 73/862.09 |
| 4,881,495 A | | 11/1989 | Tornare et al. | |
| 5,098,036 A | * | 3/1992 | Brigham | B64F 5/0054 122/26 |
| 5,190,249 A | * | 3/1993 | Whitmire | B64F 5/0063 244/134 C |
| 5,222,696 A | * | 6/1993 | Brigham | B64F 5/0054 244/134 R |
| 5,709,201 A | | 1/1998 | Puett, Jr. | |
| 6,761,135 B1 | | 7/2004 | Becktold | |
| 6,883,467 B2 | | 4/2005 | Holden | |
| 7,337,828 B2 | | 3/2008 | Lange | |
| 7,424,916 B2 | * | 9/2008 | Foster | E21B 37/00 166/303 |
| 7,614,367 B1 | * | 11/2009 | Frick | F22B 1/16 122/26 |
| 7,637,232 B2 | | 12/2009 | Foster | |
| 7,766,077 B2 | * | 8/2010 | Masters | F24D 17/00 165/200 |

(Continued)

FOREIGN PATENT DOCUMENTS

CA 2811829 A1 7/2014

OTHER PUBLICATIONS

Office Action dated Aug. 13, 2014, issued in corresponding Canadian Patent Application No. 2815986 (2 pages).

(Continued)

*Primary Examiner* — Kenneth Rinehart
*Assistant Examiner* — Deepak A Deean

(57) ABSTRACT

A dual heating process is performed in the absence of an open flame. Heat is created by a rotating prime mover(s) driving a fluid shear heater. Heat is also collected from a cooling system of the prime mover, and from any exhaust heat generated by the prime mover. The heat energy collected from all of these sources is transmitted through heat exchangers to a fluid where heat energy is desired. The fluid being heated may be glycol or air, depending on the type of heat desired.

40 Claims, 1 Drawing Sheet

(56) References Cited

U.S. PATENT DOCUMENTS

| | | | |
|---|---|---|---|
| 7,866,380 B2* | 1/2011 | Masters | F24D 17/00 165/200 |
| 8,291,868 B2 | 10/2012 | Whallon | |
| 8,469,283 B2 | 6/2013 | Sanger et al. | |
| 8,484,963 B2 | 7/2013 | Jackson et al. | |
| 9,228,760 B2* | 1/2016 | Welle | F24H 1/06 |
| 2004/0144200 A1* | 7/2004 | Giordano | F16F 15/134 464/68.92 |
| 2005/0121532 A1 | 6/2005 | Reale et al. | |
| 2006/0185621 A1 | 8/2006 | Foster et al. | |
| 2006/0260788 A1* | 11/2006 | Masters | F24D 17/00 165/110 |
| 2007/0261823 A1* | 11/2007 | Masters | F24D 17/00 165/110 |
| 2008/0185453 A1 | 8/2008 | Sanger et al. | |
| 2010/0139577 A1 | 6/2010 | Whallon | |
| 2010/0192875 A1* | 8/2010 | Frick | F22B 27/04 122/26 |
| 2011/0005757 A1* | 1/2011 | Hebert | E21B 36/006 166/302 |
| 2011/0079561 A1* | 4/2011 | Masters | F24D 17/00 210/774 |
| 2011/0120427 A1* | 5/2011 | Andersson | F02B 37/007 123/562 |
| 2011/0185713 A1* | 8/2011 | Koopmann | F01N 5/02 60/320 |
| 2011/0297353 A1 | 12/2011 | Stegeman | |
| 2012/0048717 A1* | 3/2012 | Frick | F01K 27/02 203/22 |
| 2012/0174987 A1* | 7/2012 | Crawford | B08B 9/027 137/15.04 |
| 2013/0270352 A1 | 10/2013 | Roth et al. | |
| 2014/0174691 A1 | 6/2014 | Kamps et al. | |
| 2014/0209281 A1* | 7/2014 | Kamps | F28D 7/00 165/104.14 |

OTHER PUBLICATIONS

Written Opinion dated Jun. 9, 2014, issued in corresponding International Application No. PCT/CA2014/050286 (Issued in related U.S. Appl. No. 13/835,617).

International Search Report of PCT/CA2014/050286, dated Jun. 9, 2014 (Issued in related U.S. Appl. No. 13/835,617).

Canadian Office Action dated Jan. 23, 2014, issued in related Canadian Patent Application No. 2,828,522 (2 pages).

Canadian Office Action dated Aug. 19, 2013, issued in corresponding Canadian Patent Application No. 2,815,986 (2 pages).

International Preliminary Report on Patentability (Form PCT/IB/373) issued in International Application No. PCT/CA2014/050285 dated Sep. 15, 2015, with Form PCT/ISA/237 (6 pages).

U.S. Non-Final Office Action dated Oct. 7, 2014, issued in U.S. Appl. No. 13/835,617 (23 pages).

Non-Final Office Action dated Mar. 25, 2016, issued in U.S. Appl. No. 13/835,617. (11 pages).

Office Action dated Jun. 23, 2015, issued in U.S. Appl. No. 13/835,617 (13 pages).

Office Action dated Feb. 26, 2015, issued in Canadian Application No. 2,828,522. (3 pages).

The Written Opinion of the International Searching Authority International Application No. PCT/CA2014/050919 dated Dec. 9, 2014 with Form PCT/ISA/237. (5pages).

International Search Report dated Dec. 9, 2014, issued in International Application No. PCT/CA/2014/050919. (3 pages).

Non-Final Office Action dated Jun. 17, 2016 issued in U.S. Appl. No. 14/037,123 (53 pages).

Notification of Transmittal of Translation of the International Preliminary Amendment Report on Patentability (Forms PCT/IB/326) of International Application No. PCT/CA2014/050920, dated Mar. 29, 2016 with Form PCT/IB/237 and PCT/IB/373. (7 pages).

Non-Final Office Action dated Oct. 20, 2016, issued in U.S. Appl. No. 13/835,617. (33 pages).

Extended (Supplementary) European Search Report dated Nov. 4, 2016, issued in counterpart European Patent Application No. 14762281.5. (8 pages).

USPTO Office Action for U.S. Appl. No. 14/037,123 dated Jan. 26, 2017.

USPTO Office Action for U.S. Appl. No. 13/835,617 dated Jan. 10, 2018.

USPTO Office Action for U.S. Appl. No. 14/037,123 dated Dec. 18, 2017.

* cited by examiner

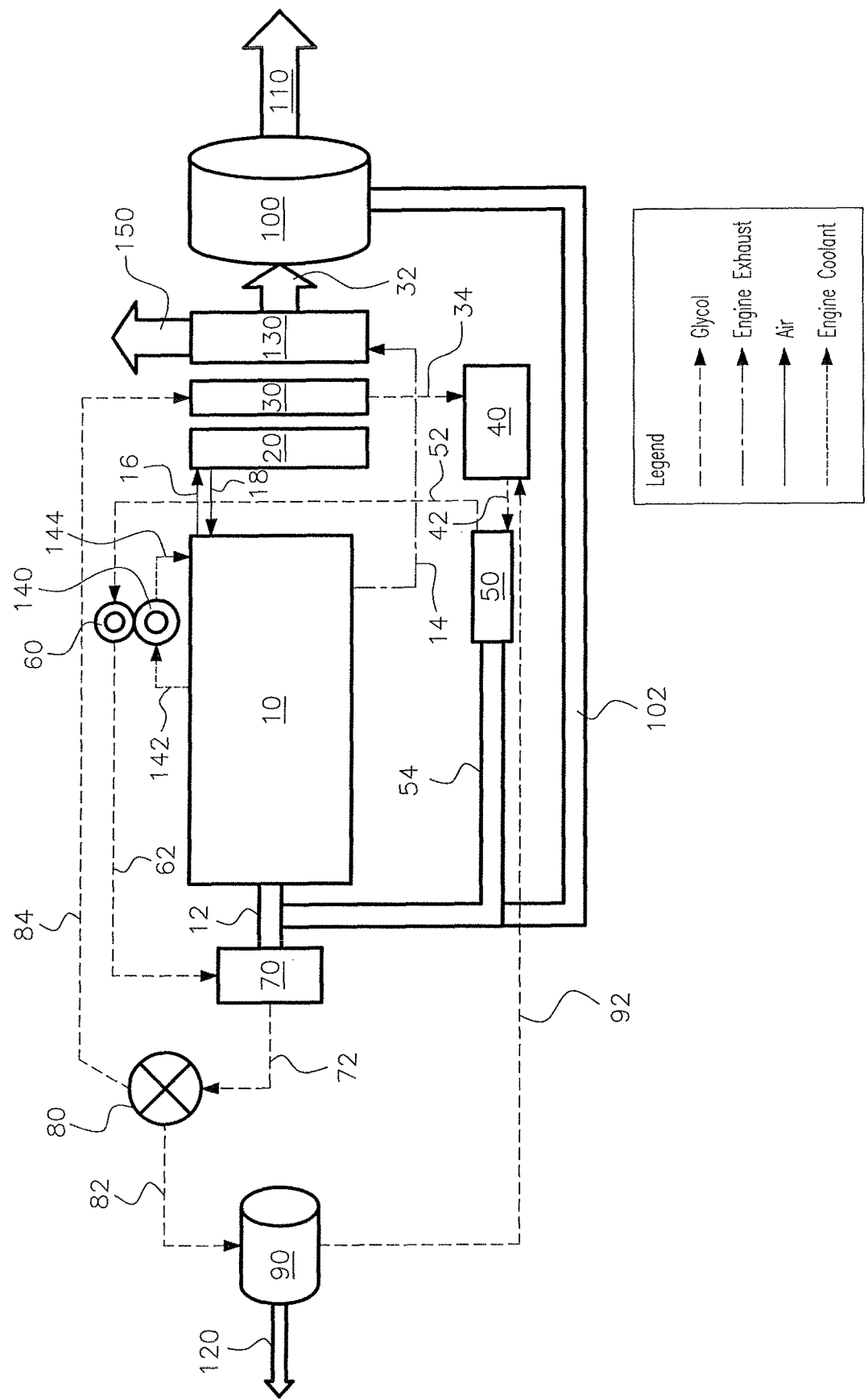

A FLAMELESS COMBO HEATER

FIELD OF THE INVENTION

The present invention generally relates to processes used to provide heat for industrial processes, where the heating process does not require an open flame.

BACKGROUND OF THE INVENTION

Industrial applications may require warm air and fluid heating capabilities of various types to avoid freezing and provide a safe, comfortable work environment. Specific environments may require that no open flame be present. This most commonly occurs in the energy industry. The present invention was created to heat air and fluids in these environments.

The present invention allows the opportunity to eliminate inefficient, labor intensive, and hazardous boilers, heat fluids contained in various tanks, thaw ground or other strata, and provide warm air in various applications. This process provides warm air and glycol at user specified ratios, and can be combined with a variety of heat exchangers to transmit the heat to a desired location. The heating process is efficient and safe, making the best use of fuel in a flameless environment.

SUMMARY OF THE INVENTION

The present invention consists of a number of major components which are connected in such a way that the process provides efficient, flameless heat. The components are generally trailer mounted, but may also be truck or skid mounted.

The largest component is the prime mover. The prime mover is most often a diesel engine, gasoline engine or natural gas engine. An electric drive may also be used depending on the environmental considerations.

Connected directly to the drive shaft of the prime mover is a dynamic heater, such as a fluid shear heater. This component utilizes the majority of the power available from the prime mover, and converts this energy into heat. The heater shears a heater fluid, typically glycol. This glycol is contained in a separate system, and may be heated by engine coolant, circulate through a heating hose, or to a liquid to air heat exchanger, or radiator, to provide warm air.

Also connected to the drive of the prime mover is a centrifugal pump to move the glycol through the system. This system includes a heating hose, and reel for the heating hose. The hose may be extended from the unit to provide heat at equipment several feet from the heating unit.

A fan, which may be driven by the prime mover, is utilized to move warm air through external ductwork to provide heat to equipment and/or personnel.

The remaining major components to the system are heat exchangers. One heat exchanger is a liquid to liquid heat exchanger which transfers heat from the engine coolant to the heating glycol. The remainder of the heat exchangers may be liquid to air or liquid to liquid, depending on if more air heat is required or more glycol heat is required. On some specific engines, an intercooler air to air heat exchanger may also be present.

Other system components include a fuel tank to operate the engine, a glycol reservoir, a trailer to house the components, and a control system to maintain operation of the system and alarm in the event of a mechanical failure.

These and other objects of the invention, as well as many of the intended advantages thereof, will become more readily apparent when reference is made to the following description taken in conjunction with the accompanying drawing.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

The FIGURE schematically illustrates the production of heated glycol and/or heated air.

DETAILED DESCRIPTION OF THE PREFERRED EMBODIMENTS

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Reference will now be made to the FIGURE for a more detailed description of the flameless glycol/air combination heater. A review of the components and then the process of the combination glycol and air heater will follow.

The purpose of this invention is to provide either hot glycol or hot air, or both, in whatever proportion that the operator desires. This means that the operator can have most of the heat generated by this machine as hot glycol or as hot air or a combination of either by simply moving a lever.

The first main component is the prime mover 10, which can be either a diesel, gas, propane or natural gas fueled engine. A prototype and a second generation model have used an air cooled intercooler, but could have a glycol cooled intercooler or no intercooler at all. The prime mover also has glycol/engine coolant heat exchanger portions 60, 140 to keep the engine running within its ideal temperature range.

Attached to the prime mover by a splined output shaft 12 is a dynamic heater 70, which is a fluid shear heater. The majority of the engine horsepower is used to shear a heating fluid in the glycol heater, which in this case is an environmentally friendly glycol. The heating fluid can be any fluid that is practical to be used in an oilfield environment. It should be environmentally friendly as well as non-combustible and be commonly used in oilfield applications. Heating fluids used in this application include oil and glycol.

The fluid shear heater 70 can use either metal plates moving across each other, spinning discs or pumping fluids through orifices to create fluid shear forces large enough to generate heat. The majority of the power generated by the engine is used for the purpose of shearing fluid to generate heat. The fluid shear heater is bolted directly to the engine and is powered by the splined output shaft 12 of the engine 10.

Between the engine and fluid shear heater is a torsional vibration dampener (not shown), which is used to smooth out the vibrations created by the prime mover 10. The use of a torsional vibration dampener extends the life of the splined output shaft 12 and the fluid shear heater 70. For the purpose of this application, glycol will be referred to as the heater fluid, but as mentioned before many other fluids could be used as well.

A glycol pump 50 driven off of drive shaft 12 by shaft 54 is used to pump glycol heating fluid throughout the system. Pump 50 must be capable of pumping glycol at temperatures of up to approximately 200° F. (100° C.).

Air/air intercooler 20 is a standard air to air intercooler as used in trucks and heavy machinery to cool compressed air from pipe 16 and return cooled air to engine 10 by pipe 18.

Radiator 30 is a standard radiator used in automotive applications. Radiator 30 is used to dissipate heat from glycol or similar fluids using air as the cooling medium.

Exhaust heat exchanger 130 is an air to air heat exchanger. It is sized so that the incoming engine exhaust from pipeline 14 at up to 700° F. (400° C.) can be cooled down to 70° F. (20°-25° C.) and released by outlet 150.

Air fan 100 is a centrifugal fan sized for the amount of air required by the operator and to utilize the heat in the engine exhaust as moved through pipeline 14 to exhaust heat exchanger 130. Cooled exhaust air is released through outlet 150. Additional heated air is provided by intercooler 20 and radiator 30.

Glycol/air valve 80 is a variable control valve that is used to vary the amount of glycol passed between radiator 30 and glycol hose 90. Glycol hose 90 is mounted on a reel that contains two lengths of hose, which are capable of transporting hot glycol. The reel allows the hoses to be uncoiled and moved to wherever they are needed.

The Heating Process

Before starting the prime mover 10, the operator should determine at what position the glycol/air valve 80 should be. The unit is then started and allowed to warm up to a predetermined temperature. The prime mover 10 is then sped up to maximum power and rpm. At this time, the fluid heater 70 starts to generate heat.

There are four sources of heat in this process. The first source is the fluid heater 70, the second is the intercooler 20, the third is the engine coolant heat exchanger portions 60, 140 and the fourth is the engine exhaust heat exchanger 130.

The glycol to be heated is pumped from the glycol reservoir 40 along pipeline 42 to the glycol pump 50 and then along pipeline 52 to the engine coolant heat exchanger portion 60. Heat is transferred at the engine coolant heat exchanger portion 140 from the hot engine coolant circulating therethrough to the glycol in exchanger portion 60. The engine coolant is continuously pumped along pipelines 142, 144 by its own engine coolant pump for transfer of heat to heat exchanger portion 60.

The glycol is then pumped from this exchanger portion 60 to the fluid shear heater 70 along pipeline 62, where the glycol is heated from the internal friction and shearing in the heater 70. After leaving the fluid shear heater 70, the glycol is pumped to the glycol/air valve 80 along pipeline 72. The glycol is sent to either the glycol hose 90 by pipeline 82, or to the radiator 30 by pipeline 84, or a combination of both, depending on a position of a valve lever or a positioning of the valve 80 as selected by the operator.

If 100% glycol is selected by the operator at the glycol/air valve 80 then all of the glycol will be directed to the hose 90 by pipeline 82 for release of heat shown at 120. The cooled glycol is returned along pipeline 92 to the glycol reservoir 40. The process to heat the glycol is then repeated.

The only heat to be output as air will be from the intercooler 20, the radiator 30 and the exhaust heat exchanger 130 moving in the direction of arrow 32. Hot air is drawn off in the direction of arrow 32 by fan 100 (driven by shaft 102 off of drive shaft 12). Heated air is exhausted through external duct work in the direction of arrow 110.

If the operator selects 100% air on the glycol/air valve 80 then all of the glycol flow will be sent to the radiator 30 along pipeline 84, resulting in all of the heat generated from the heated glycol to be output as heated air. The heated air is drawn off by fan 100 in the direction of arrow 32 to the duct 110. The cooled glycol is returned to glycol reservoir 40 by pipe 34.

Any position other than the above two in the valve 80 will result in partial proportional flow to either the hose 90 or the radiator 30. The amount of heated glycol compared to heated air is thereby controlled.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A flameless combination heater for heating air and a heater fluid, the flameless combination heater comprising:
    a prime mover system including an engine, an intercooler and at least one heat removal means;
    an air moving system; and
    a heater fluid system comprising:
        heater fluid;
        a first heat exchanger configured to transfer heat from one of the at least one heat removal means to the heater fluid;
        a dynamic heater in fluid communication with the first heat exchanger for heating the heater fluid, the dynamic heater driven by the prime mover system;
        a second heat exchanger configured to transfer heat from the heater fluid to air in the air moving system, the air moving system configured to permit transfer of heat from the intercooler to the air in the air moving system; and
        a variable valve configured to direct a first portion of heater fluid received from the dynamic heater to the second heat exchanger via a first pipeline and to direct a remaining second portion of the heater fluid received from the dynamic heater to a heater fluid heat output via a second pipeline.

2. The flameless combination heater of claim 1, wherein the at least one heat removal means further comprises engine coolant.

3. The flameless combination heater of claim 1, wherein the at least one heat removal means further comprises an engine exhaust.

4. The flameless combination heater of claim 3, wherein the air moving system comprises a third heat exchanger for transferring heat from the engine exhaust to air in the air moving system.

5. The flameless combination heater of claim 1, wherein the air moving system comprises a fan driven by the prime mover system.

6. The flameless combination heater of claim 1, wherein the heater fluid output comprises a hose.

7. The flameless combination heater of claim 1, wherein the dynamic heater is downstream from the first heat exchanger.

8. The flameless combination heater of claim 1, wherein the heater fluid system is a closed system.

9. The flameless combination heater of claim 8, wherein the heater fluid system comprises a reservoir in fluid communication with the heater fluid heat output and the second heat exchanger.

10. The flameless combination heater of claim 1, wherein the heater fluid comprises glycol.

11. The flameless combination heater of claim 1, wherein the engine is one of a diesel engine, gasoline engine, or natural gas engine.

12. The flameless combination heater of claim 1, further comprising a torsional vibration dampener between the prime mover system and the dynamic heater.

13. The flameless combination heater of claim 1, wherein the variable valve is a three-way valve.

14. A flameless combination heater for heating air and a heater fluid, the flameless combination heater comprising:
 a prime mover system including an engine, circulating engine coolant and an intercooler; and
 a closed heater fluid system comprising:
  a heater fluid reservoir;
  a pump configured to pump heater fluid from the reservoir to a first heat exchanger, the first heat exchanger configured to transfer heat from the engine coolant to the heater fluid;
  a dynamic heater configured to heat heater fluid received from the first heat exchanger; and
  a variable valve configured to regulate distribution of the heater fluid from the dynamic heater between a heater fluid output means of the flameless combination heater and a second heat exchanger for heating air for output by the flameless combination heater, the air for output being heatable by at least the second heat exchanger and the intercooler.

15. The flameless combination heater of claim 14, wherein the reservoir is in fluid communication with the heat output means and the second heat exchanger.

16. The flameless combination heater of claim 14, wherein the heater fluid output means comprises a hose.

17. The flameless combination heater of claim 14 further comprising an air moving system, the air moving system moving the air heated by the second heat exchanger.

18. The flameless combination heater of claim 17, wherein the air moving system further comprises at least one additional heat exchanger for further heating the air.

19. The flameless combination heater of claim 18, wherein the prime mover system includes an exhaust and the at least one additional heat exchanger transfers heat from the exhaust to the air.

20. The flameless combination heater of claim 18, wherein the at least one additional heat exchanger transfers heat from the intercooler to the air.

21. The flameless combination heater of claim 17, wherein the air moving system includes a fan driven by the prime mover system.

22. The flameless combination heater of claim 14, wherein the heater fluid comprises glycol.

23. The flameless combination heater of claim 14, wherein the variable valve is a three-way valve.

24. The flameless combination heater of claim 14, wherein the engine is one of a diesel engine, gasoline engine, or natural gas engine.

25. A method for heating a heater fluid and air using a flameless heating system, the flameless heating system comprising a dynamic heater driven by a prime mover including an engine, the method comprising:
 transferring the heater fluid through a first heat exchanger transferring heat from engine coolant circulating through the prime mover to the heater fluid;
 transferring the heater fluid from the first heat exchanger through the dynamic heater to further transfer heat from the dynamic heater to the heater fluid;
 directing, via a variable valve, a first portion of the heater fluid from the dynamic heater to a second heat exchanger via a first pipeline,
 directing, via the variable valve, a remaining second portion of the heater fluid received from the dynamic heater providing a first heat output of the flameless heating system via a second pipeline; and
 heating air using the second heat exchanger and an intercooler of the prime mover, the heated air providing a second heat output of the flameless heating system.

26. The method of claim 25, further comprising:
 further heating the air using a heat exchanger transferring heat from an exhaust of the prime mover to the air.

27. The method of claim 25, wherein the second heat exchanger comprises a radiator.

28. The method of claim 25, wherein the remainder of the heater fluid is directed to a heater fluid hose.

29. The method of claim 25, wherein the heater fluid comprises glycol.

30. The method of claim 25, wherein the heater fluid is contained in a closed system.

31. The method of claim 25, further comprising varying the portion of heater fluid directed from the dynamic heater to the second heat exchanger.

32. The method of claim 31, wherein varying the portion of heater fluid directed from the dynamic heater to the second heat exchanger comprises adjustment of the variable valve in communication with the dynamic heater, second heat exchanger, and a first heat output means.

33. A method for heating a heater fluid and air using a flameless heating system, the flameless heating system comprising a dynamic heater driven by a prime mover including an engine, the method comprising:
 heating the heater fluid using:
 the dynamic heater;
 a first heat exchanger transferring heat removed from the prime mover while driving the dynamic heater to the heater fluid; and then
 directing, via a variable valve, a first portion of the heater fluid thus heated to a second heat exchanger for heating air, the air also being heated by an intercooler of the prime mover, the heated air thus providing a heat output of the flameless heating system, and
 directing, via the variable valve, a remaining second portion of the heater fluid thus heated providing another heat output of the flameless heating system.

34. The method of claim 33, wherein the heater fluid circulates in a system comprising at least the dynamic heater, the first heat exchanger, and the second heat exchanger, and the dynamic heater is downstream from the first heat exchanger.

35. The method of claim 33, wherein the first heat exchanger comprises an engine coolant heat exchanger of the prime mover.

36. The method of claim 33, wherein the second heat exchanger comprises a radiator.

37. The method of claim 33, wherein the air is further heated by at least one other heat exchanger removing heat from the prime mover.

38. The method of claim 37, wherein the at least one other heat exchanger comprises an exhaust of the prime mover.

39. The method of claim 33, further comprising varying the portion of the heater fluid thus heated to the second heat exchanger.

40. The method of claim 39, wherein varying the portion of the heater fluid thus heated to the second heat exchanger comprises adjustment of the variable valve controlling distribution of the heater fluid to the second heat exchanger and to a component of the flameless heating system providing the other heat output.

* * * * *